(12) United States Patent
Nagao

(10) Patent No.: US 10,627,956 B2
(45) Date of Patent: Apr. 21, 2020

(54) TERMINAL DEVICE, CALIBRATION METHOD AND CALIBRATION PROGRAM

(71) Applicant: PIONEER CORPORATION, Kanagawa (JP)

(72) Inventor: Shunichiro Nagao, Tokyo (JP)

(73) Assignee: PIONEER CORPORATION, Kanagawa (JP)

( * ) Notice: Subject to any disclaimer, the term of this patent is extended or adjusted under 35 U.S.C. 154(b) by 154 days.

(21) Appl. No.: 15/888,192

(22) Filed: Feb. 5, 2018

(65) Prior Publication Data

US 2018/0210609 A1  Jul. 26, 2018

Related U.S. Application Data

(62) Division of application No. 15/108,507, filed as application No. PCT/JP2013/085210 on Dec. 27, 2013, now Pat. No. 9,886,134.

(51) Int. Cl.
*G06F 3/041* (2006.01)
*G06F 3/14* (2006.01)
(Continued)

(52) U.S. Cl.
CPC ........ *G06F 3/0418* (2013.01); *G02F 1/13338* (2013.01); *G06F 1/1698* (2013.01);
(Continued)

(58) Field of Classification Search
CPC .... G06F 3/0418; G06F 3/1423; G06F 3/1454; G09G 2320/0693; G09G 2370/12
See application file for complete search history.

(56) References Cited

U.S. PATENT DOCUMENTS 8,990,682 B1 * 3/2015 Wong ................... G02B 27/017
715/254
2010/0259491 A1 10/2010 Rajamani et al.
(Continued)

FOREIGN PATENT DOCUMENTS

JP  2010-130670  6/2010
JP  2012-018587  1/2012
(Continued)

OTHER PUBLICATIONS

International Search Report, PCT/JP2013/085210, dated Jan. 28, 2014.
(Continued)

*Primary Examiner* — Ricardo Osorio
(74) *Attorney, Agent, or Firm* — Young & Thompson

(57) ABSTRACT

A terminal device such as a smartphone displays a first image on a display unit, and outputs a second image including the first image as a part to a display device such as a navigation device. Also, the terminal device obtains relative position information indicating a relative positional relation of the first image with respect to the second image from an external server. When a user makes a touch input to the second image displayed on the display device, the input position is transmitted from the display device to the terminal device. The terminal device obtains the conversion necessity information indicating whether or not the input position on the second image needs to be converted based on the relative position information, and converts the input position on the second image to the input position on the first image based on the relative position information when the conversion is necessary.

15 Claims, 7 Drawing Sheets

(51) Int. Cl.
   *G06F 1/16* (2006.01)
   *G02F 1/1333* (2006.01)
(52) U.S. Cl.
   CPC .......... *G06F 3/0412* (2013.01); *G06F 3/0416* (2013.01); *G06F 3/14* (2013.01); *G06F 3/1423* (2013.01); *G06F 3/1454* (2013.01); *G09G 2320/0693* (2013.01); *G09G 2370/022* (2013.01); *G09G 2370/12* (2013.01)

(56) References Cited

U.S. PATENT DOCUMENTS

| | | | |
|---|---|---|---|
| 2011/0117958 A1* | 5/2011 | Kim | G03B 35/10 455/556.1 |
| 2013/0109473 A1* | 5/2013 | Yamashita | A63F 13/2145 463/31 |
| 2013/0207995 A1* | 8/2013 | Yoshida | G06F 3/1454 345/600 |
| 2013/0222238 A1* | 8/2013 | Sliger | G06F 3/0484 345/157 |
| 2014/0111454 A1 | 4/2014 | Hosoi et al. | |
| 2015/0015479 A1* | 1/2015 | Cho | G06F 3/013 345/156 |
| 2015/0109262 A1 | 4/2015 | Nagao et al. | |
| 2015/0154728 A1 | 6/2015 | Nara et al. | |
| 2015/0381883 A1* | 12/2015 | Kawai | H04N 5/23293 348/333.08 |
| 2017/0019658 A1* | 1/2017 | Lee | G01S 17/08 |

FOREIGN PATENT DOCUMENTS

| | | | | |
|---|---|---|---|---|
| JP | 2012-524474 | 10/2012 | | |
| JP | 2012-253736 | 12/2012 | | |
| JP | 2013-254435 | 12/2013 | | |
| KR | 101179912 B1 * | 9/2012 | ............. | G06F 3/041 |
| WO | 2013/150637 | 10/2013 | | |

OTHER PUBLICATIONS

AppRadio Pioneer Electronics USA <URL: http://www.pioneerelectronics.com/PUSA/Car/AppRadio>.

* cited by examiner

FIG. 4
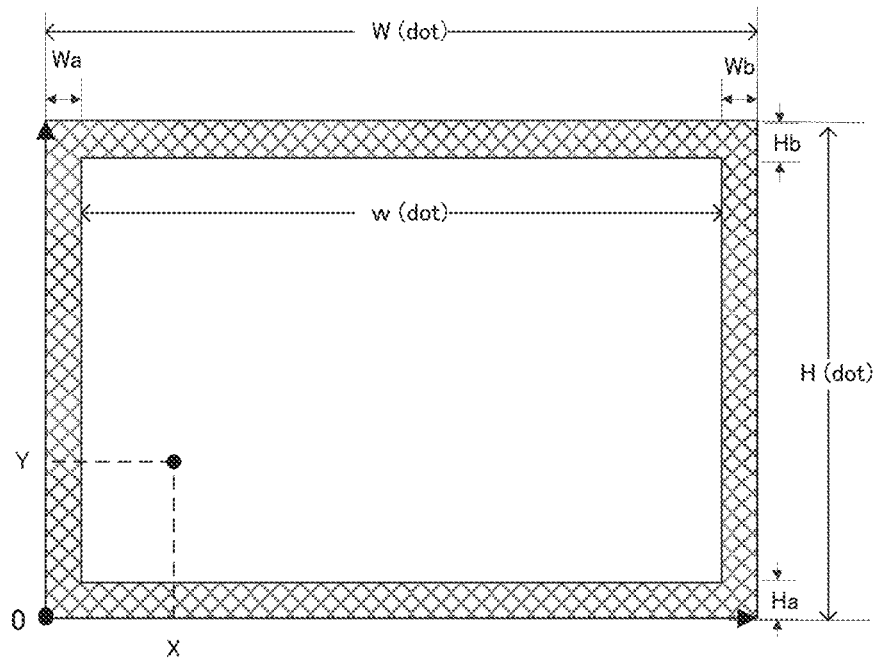
(DISPLAY DEVICE)
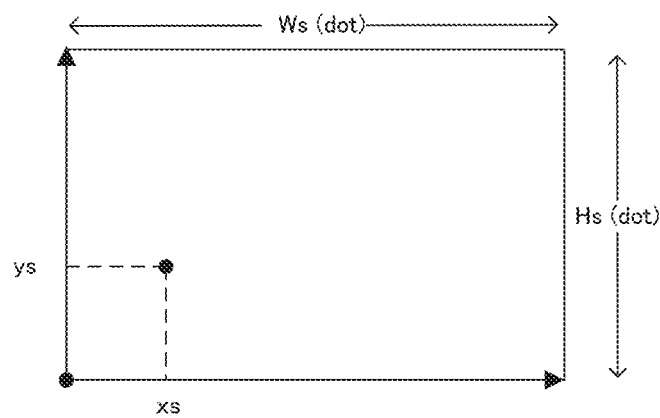
(SMARTPHONE)
X COORDINATE OF SMARTPHONE:
$xs = Ws * x / w$
$\quad = Ws * (X-Wa) / \{W-(Wa+Wb)\}$

TERMINAL DEVICE, CALIBRATION METHOD AND CALIBRATION PROGRAM

TECHNICAL FIELD

The present invention relates to calibration of a touch input to a terminal device and a display device connected to each other.

BACKGROUND TECHNIQUE

In recent years, an on-vehicle device such as a car navigation device and a terminal device such as a smartphone are connected and used.

For example, Patent Reference 1 discloses a system in which a portable terminal and an on-vehicle device are cooperated and an application executed on the terminal device is operated from the on-vehicle device.

Non-Patent Reference 1 proposes a technique of transmitting a display image of a smartphone to an on-vehicle device to be displayed on a display unit of the on-vehicle device and operating an application on the smartphone by a touch input to the display unit of the on-vehicle device, by installing a dedicated module to the application installed in the smartphone.

When the display image of the smartphone is transmitted to the display device and displayed like Non-Patent Reference 1, the number of pixels and the aspect ratio of the display images are not necessarily the same between the smartphone and the display device. Therefore, according to the model of the smartphone, a black frame area is added at the top, bottom, left and right part of the outputted image in order to maintain the aspect ratio of the outputted image. Namely, the image displayed on the touch panel of the display device is the image created by adding the black frame area to the top, bottom, left and right part of the display image of the smartphone.

In this case, since the black frame area is included in the display image, the display device cannot discriminate whether or not the black frame area is being displayed. Therefore, when a part of the black frame area is touched on the touch panel of the display device, the smartphone may determine that the area within the display image is touched, although the touched area includes no button and the like. In addition, since the area of the image displayed on the touch panel of the display device does not coincide with the actual touch area, the coordinates of the point touched by a user may shift even inside of the black frame area.

In this view, the Patent Reference 2 discloses the method of preparing the calibration information for each combination of the smartphone and the display device and converting the input coordinates inputted by the user on the display device to the input coordinates of the smartphone based on the calibration information.

PRIOR ART REFERENCE

Patent Reference

Patent Reference 1: Japanese Patent Application Laid-open under No. 2010-130670
Patent Reference 2: International Publication WO2013/150637

Non-Patent Reference

Non-Patent Reference 1: AppRadio Pioneer Electronics USA http://www.pioneerelectronics.com/PUSA/Car/AppRadio

SUMMARY OF INVENTION

Problem to be Solved by the Invention

However, there exist some display devices loaded on a vehicle, that has a function to individually cope with the black frame being displayed as described above. For the display device having such a function, the coordinate conversion processing like Patent Reference 2 is not necessary. Also, if the smartphone executes the processing like Patent Reference 2 after the display device individually executes the processing for the black frame, there may occur such a problem that the coordinates that the smartphone recognize are shifted.

The above is one example of a problem to be solved by the present invention. It is an object of the present invention to enable easy correction of a shift of an input position caused by the shift of the display images of the terminal device and the display device, according to the function of the display device.

Means for Solving the Problem

The invention described in claims is a terminal device comprising: a display unit configured to display a first image; an image output unit configured to output a second image including the first image as a part to a display device; an input position obtaining unit configured to obtain, from the display device, an input position on the second image indicating a position of a touch input that a user made to the second image displayed on the display device; a relative position information obtaining unit configured to obtain, from an external server, a relative position information indicating a relative positional relation of the first image with respect to the second image; a conversion necessity information obtaining unit configured to obtain, from the display device, a conversion necessity information indicating whether or not the input position on the second image needs to be converted based on the relative position information; and a converter configured to convert the input position on the second image to the input position on the first image based on the relative position information when the conversion necessity information obtaining unit obtains the conversion necessity information indicating that the conversion is necessary.

The invention described in claims is a calibration method executed by a terminal device including a display unit, comprising: a display process which displays a first image; an image output process which outputs a second image including the first image as apart to a display device; an input position obtaining process which obtains, from the display device, an input position on the second image indicating a position of a touch input that a user made to the second image displayed on the display device; a relative position information obtaining process which obtains, from an external server, a relative position information indicating a relative positional relation of the first image with respect to the second image; a conversion necessity information obtaining process which obtains, from the display device, a conversion necessity information indicating whether or not the input position on the second image needs to be converted based on the relative position information; and a conversion process which converts the input position on the second image to the input position on the first image based on the relative position information when the conversion necessity information obtaining unit obtains the conversion necessity information indicating that the conversion is necessary.

The invention described in claims is a calibration program executed by a terminal device including a display unit and a computer, the program making the computer execute: a display process which displays a first image; an image output process which outputs a second image including the first image as a part to a display device; an input position obtaining process which obtains, from the display device, an input position on the second image indicating a position of a touch input that a user made to the second image displayed on the display device; a relative position information obtaining process which obtains, from an external server, a relative position information indicating a relative positional relation of the first image with respect to the second image; a conversion necessity information obtaining process which obtains, from the display device, a conversion necessity information indicating whether or not the input position on the second image needs to be converted based on the relative position information; and a conversion process which converts the input position on the second image to the input position on the first image based on the relative position information when the conversion necessity information obtaining unit obtains the conversion necessity information indicating that the conversion is necessary.

BRIEF DESCRIPTION OF THE DRAWINGS

FIG. 4 illustrates an example of an input position conversion method.

DETAILED DESCRIPTION OF THE PREFERRED EMBODIMENTS

Figure 1:
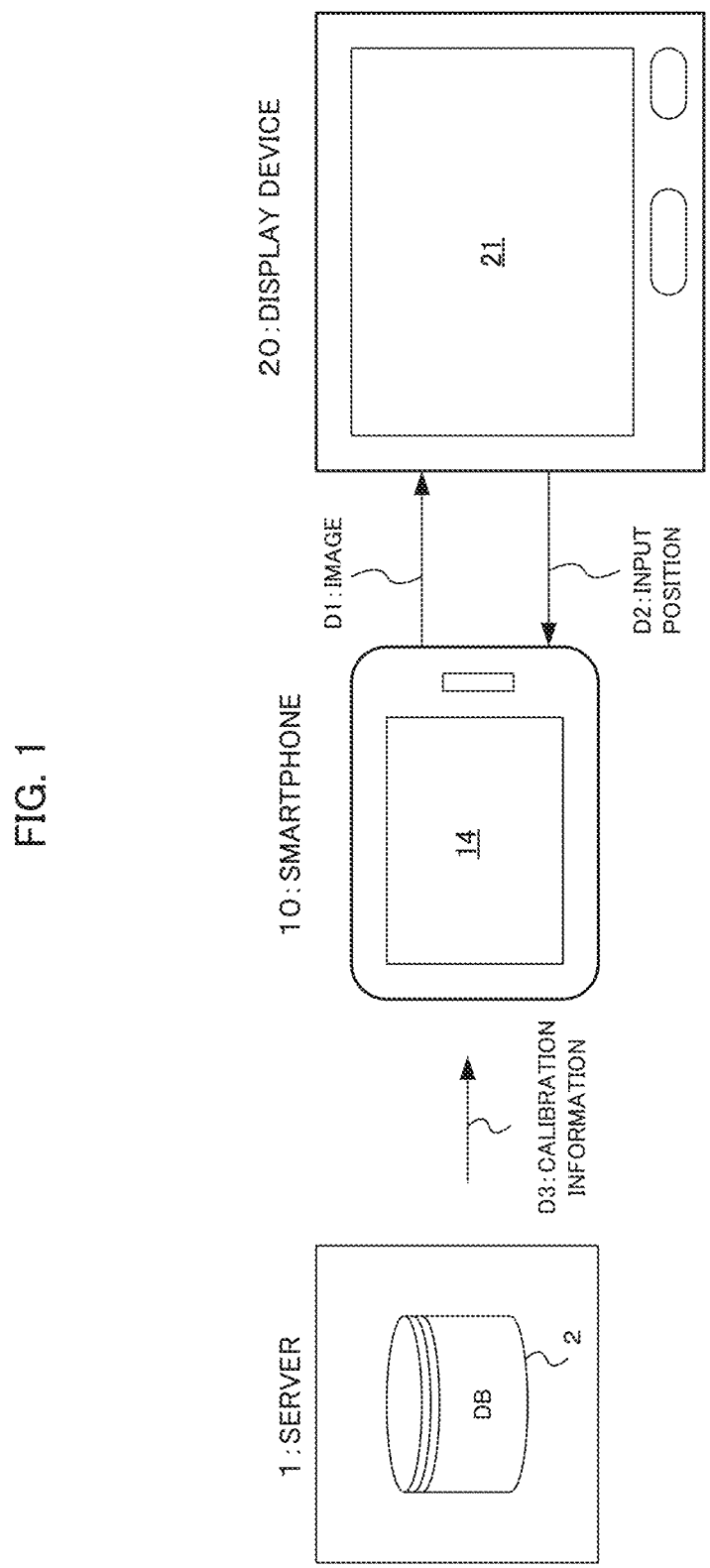
FIG. 1 illustrates a system according to an embodiment of the present invention.

According to one aspect of the present invention, there is provided a terminal device comprising: a display unit configured to display a first image; an image output unit configured to output a second image including the first image as a part to a display device; an input position obtaining unit configured to obtain, from the display device, an input position on the second image indicating a position of a touch input that a user made to the second image displayed on the display device; a relative position information obtaining unit configured to obtain, from an external server, a relative position information indicating a relative positional relation of the first image with respect to the second image; a conversion necessity information obtaining unit configured to obtain, from the display device, a conversion necessity information indicating whether or not the input position on the second image needs to be converted based on the relative position information; and a converter configured to convert the input position on the second image to the input position on the first image based on the relative position information when the conversion necessity information obtaining unit obtains the conversion necessity information indicating that the conversion is necessary.

The above terminal device such as a smartphone displays a first image on a display unit, and outputs a second image including the first image as a part to a display device such as a navigation device. Also, the terminal device obtains relative position information indicating a relative positional relation of the first image with respect to the second image from an external server. When a user makes a touch input to the second image displayed on the display device, the input position is transmitted from the display device to the terminal device. The terminal device obtains the conversion necessity information indicating whether or not the input position on the second image needs to be converted based on the relative position information, and converts the input position on the second image to the input position on the first image based on the relative position information when the conversion is necessary. Thereby, when the specifications are different between the display unit of the terminal device and the display unit of the display device and the coordinate conversion is necessary on the terminal device side, the input position to the display device can be correctly converted to the input position to the terminal device. On the other hand, when the display device has the coordinate conversion function and the coordinate conversion on the terminal device side is not necessary, the coordinate conversion is not performed. Therefore, it can be prevented that the input position is shifted by the unnecessary coordinate conversion.

In one mode of the above terminal device, the relative position information obtaining unit stores the relative position information obtained from the external server into a storage unit in the terminal device, and the converter uses the relative position information stored in the storage unit when the relative position information obtained in the past is stored in the storage unit. Thereby, it becomes unnecessary to obtain the relative position information every time from the external server, and the communication amount can be reduced.

Another mode of the above terminal device further comprises: a calibration image output unit configured to supply a calibration image to the display device; a calibration input position obtaining unit configured to obtain, from the display device, a calibration input position indicating a position of the touch input that the user made to the calibration image displayed on the display device; a relative position information generating unit configured to generate the relative position information based on the obtained calibration input position; and a communication unit configured to transmit the generated relative position information to the external server.

In this mode, when the relative position information cannot be obtained from the external server, the relative position information can be generated based on the input by the user to the calibration image. Also, by uploading the generated relative position information to the server, many users can share the relative position information.

According to another aspect of the present invention, there is provided a calibration method executed by a terminal device including a display unit, comprising: a display process which displays a first image; an image output process which outputs a second image including the first image as a part to a display device; an input position obtaining process which obtains, from the display device, an input position on the second image indicating a position of a touch input that a user made to the second image displayed on the display device; a relative position information obtaining process which obtains, from an external server, a relative position information indicating a relative positional relation of the first image with respect to the second image; a conversion necessity information obtaining process which obtains, from the display device, a conversion necessity information indicating whether or not the input position on the second image needs to be converted based on the relative position information; and a conversion process which converts the input position on the second image to the input position on the first image based on the relative position information when the conversion necessity information obtaining unit obtains the conversion necessity information indicating that the conversion is necessary. Thereby, when the specifications are different between the display unit of the terminal device and the display unit of the display device and the coordinate conversion is necessary on the terminal device side, the input position to the display device can be correctly converted to the input position to the terminal device.

According to still another aspect of the present invention, there is provided a calibration program executed by a terminal device including a display unit and a computer, the program making the computer execute: a display process which displays a first image; an image output process which outputs a second image including the first image as a part to a display device; an input position obtaining process which obtains, from the display device, an input position on the second image indicating a position of a touch input that a user made to the second image displayed on the display device; a relative position information obtaining process which obtains, from an external server, a relative position information indicating a relative positional relation of the first image with respect to the second image; a conversion necessity information obtaining process which obtains, from the display device, a conversion necessity information indicating whether or not the input position on the second image needs to be converted based on the relative position information; and a conversion process which converts the input position on the second image to the input position on the first image based on the relative position information when the conversion necessity information obtaining unit obtains the conversion necessity information indicating that the conversion is necessary. Thereby, when the specifications are different between the display unit of the terminal device and the display unit of the display device and the coordinate conversion is necessary on the terminal device side, the input position to the display device can be correctly converted to the input position to the terminal device.

EMBODIMENTS

A preferred embodiment of the present invention will be described below with reference to the attached drawings.

[Basic Configuration]

FIG. 1 illustrates a configuration of a system including a terminal device according to an embodiment of the present invention. As shown in FIG. 1, the system includes a server 1, a smartphone 10 and a display device 20.

The smartphone 10 and the display device 20 are configured to be able to communicate with each other. The smartphone 10 corresponds to the terminal device of the present invention. The display device 20 is a device loaded on a vehicle, such as a navigation device or an on-vehicle AV equipment.

In this system, the display image of the smartphone 10 is transmitted to the display device 20 and is displayed on the display device 20. When a user makes an operational input to the display device 20, the display device 20 transmits a signal corresponding to the operational input to the smartphone 10. Thus, the user can operate the smartphone 10 by making the operational input to the display device 20.

The smartphone 10 displays the image on a touch panel (display unit) 14 using a liquid crystal display, for example. The smartphone 10 transmits the image D1 displayed on the touch panel 14 to the display device 20 via HDMI (High Definition Multimedia Interface) (Registered Trademark), for example.

The display device 20 includes a touch panel (display device) 21 using a liquid crystal display, for example. The display device 20 receives the image D1 from the smartphone 10 and displays it on the touch panel 21. Also, the display device 20 detects the operational input that the user made to the touch panel 21, and transmits its input position (position coordinates) D2 to the smartphone 10. The input position D2 is transmitted to the smartphone 10 by SPP (Serial Port Profile) of Bluetooth (Registered Trademark), for example.

The server 1 includes a database 2. The database 2 stores relative position information D3 (hereinafter also referred to as "calibration information D3"). The smartphone 10 accesses the server 1 by a wireless communication function, and is able to download the calibration information D3.

[In Case of Display Device without Image Size Adjusting Function]

Figure 2:
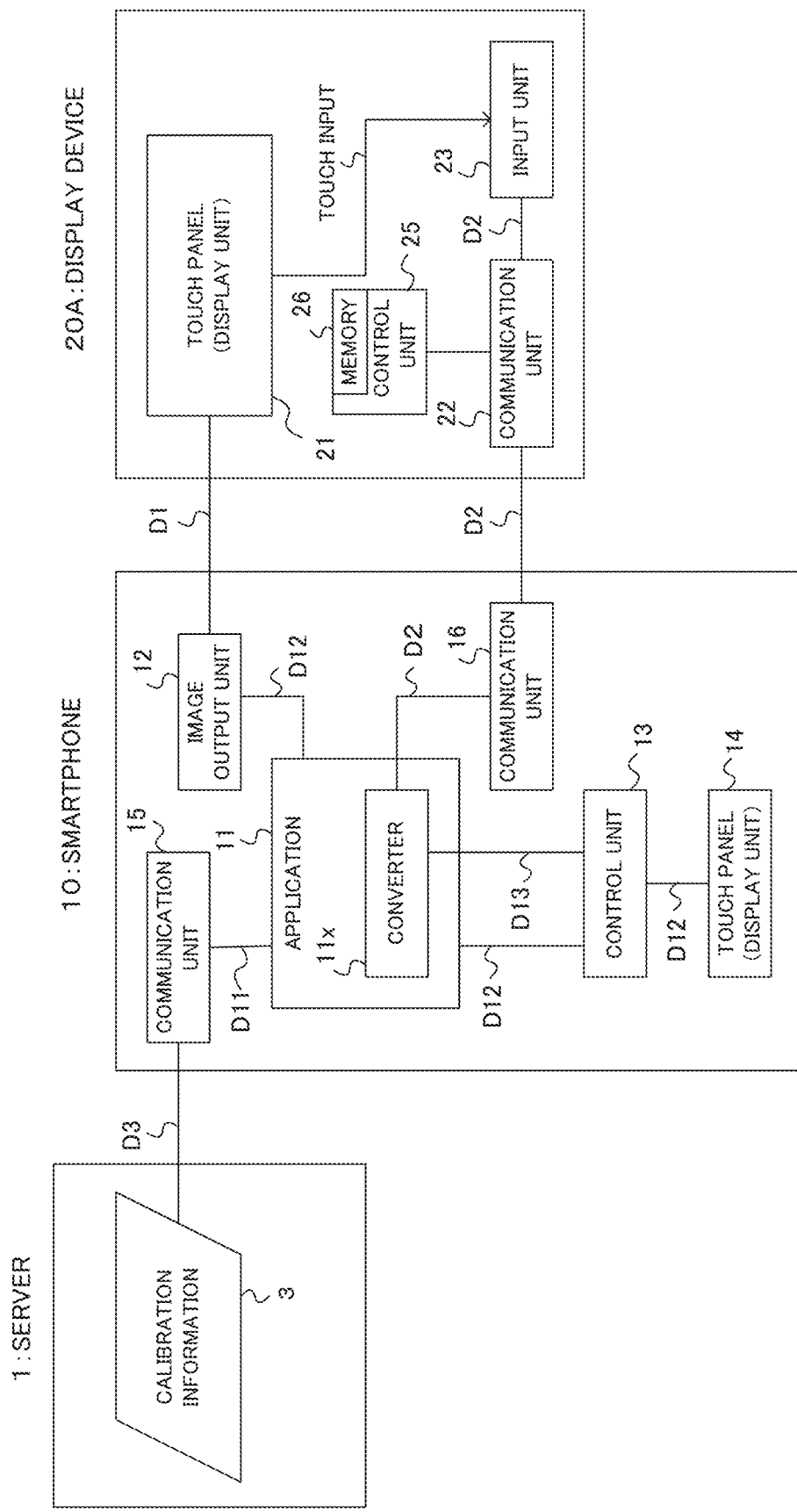
FIG. 2 is a block diagram illustrating a functional configuration of the system when a display device without an image size adjusting function is used.

FIG. 2 is a block diagram illustrating a functional configuration of the system shown in FIG. 1 when a display device 20A without an image size adjusting function is used. In the following description, "the display device 20A" indicates the display device without the image size adjusting function, "the display device 20B" indicates the display device with the image size adjusting function, and "the display device 20" includes both of them.

The image size adjusting function is such a function that a user arbitrarily cuts out a part of an image displayed on a display device, enlarges the image thus cut out to the whole size of the screen and displays it, for example. In the example of FIG. 2, since the display device 20A does not have the image size adjusting function, the smartphone 10 performs the following coordinate conversion to adjust the size of the image displayed on the smartphone 10 and the size of the image displayed on the display device 20A.

The smartphone 10 includes an application 11, an image output unit 12, a control unit 13, the touch panel 14 and communication units 15 and 16.

The application 11 is executed on the smartphone 10, and is used to operate the smartphone 10 by the display device 20 as described above. The application 11 is realized by a computer such as a CPU which executes a program prepared in advance. The application 11 functions as an input position obtaining unit, a calibration information obtaining unit, a calibration image output unit, a calibration position information obtaining unit, a conversion necessity information obtaining unit and a calibration information generation unit according to the present invention.

The image output unit 12 receives the display image of the smartphone 10 from the application 11, and transmits it to the display device 20 as the image D1.

The control unit 13 controls the smartphone 10 in its entirety, and is actually realized by an OS and a basic application installed in the smartphone 10. The control unit 13 displays the image D12 generated by various applications operating on the smartphone 10 on the touch panel 14 and also supplies the image D12 to the application 11.

The communication unit 15 has a communication function to perform the wireless communication with the server 1 and receive the calibration information D3 from the server 1. The communication unit 16 has a communication function to receive the input position D2 corresponding to the user's operational input from the display device 20.

Meanwhile, the display device 20A includes the touch panel 21, a communication unit 22, an input unit 23 and a control unit 25. The touch panel 21 is used when the user makes a desired operational input. The input unit 23 detects the operational input that the user made to the touch panel 21, and supplies its input position D2 to the communication unit 22. The communication unit 22 transmits the input position D2 to the smartphone 10.

The control unit 25 controls the display device 20A in its entirety. Also, the control unit 25 includes a memory 26. The memory 26 stores information indicating whether or not the display device itself has the image size adjusting function. The information indicating whether or not the display device has the image size adjusting function may be set as a flag (hereinafter referred to as "Adjusting Function Flag"). As an example, the display device that has the image size adjusting function stores "Adjusting Function Flag=1" in its memory 26. On the contrary, the display device that does not have the image size adjusting function stores "Adjusting Function Flag=0" in its memory 26. In the example of FIG. 2, since the display device 20A does not have the image size adjusting function, the memory 26 stores "Adjusting Function Flag=0" in the memory 26.

When the display device 20A is connected to the smartphone 10, the control unit 25 notifies the smartphone 10 of the necessity of the coordinate conversion on the smartphone 10 side based on the value of the Adjusting Function Flag stored in the memory 26. In the example of FIG. 2, since the display device 20A does not have the image size adjusting function and hence the smartphone 10 need to perform the coordinate conversion so as to absorb the difference between the image size of the smartphone 10 and the image size of the display device 20A, the control unit 25 notifies the smartphone 10 of the necessity of the coordinate conversion on the smartphone 10 side ("Coordinate Conversion: Necessary").

Next, the processing executed by the application 11 will be described. The application 11 receives the image D12 generated by various applications executed on the smartphone 10 from the control unit 13, and supplies it to the image output unit 12. The image output unit 12 transmits the image D12 to the display device 20A as the image D1. The display device 20A displays the received image D1 on the touch panel 21. Thus, the display image of the smartphone 10 is displayed on the touch panel 21 of the display device 20A.

The user watches the display image on the display device 20A and makes the operational input to the touch panel 21 of the display device 20A. Specifically, the user makes the operational input by touching the button in the image displayed on the touch panel 21. This operational input is detected by the input unit 23, and the input position D2 corresponding to the operational input is transmitted to the smartphone 10 via the communication unit 22.

In the smartphone 10, the communication unit 16 receives the input position D2 and supplies it to the application 11. The application 11 obtains the input position of the user's operational input to the smartphone 10, and supplies the input position to the control unit 13. The control unit 13 executes the processing corresponding to the user's operational input based on the display image D12 and the input position received from the application 11. Thus, the smartphone 10 can be operated from the display device 20.

(Conversion Method of Input Position)

When the image of the smartphone 10 is transmitted to and displayed on the display device 20, it is not necessarily ensured that the specifications, specifically the number of pixels and the aspect ratio, of the touch panel 14 of the smartphone 10 and the touch panel 21 of the display device 20 coincide with each other. Therefore, there is a case that the smartphone 10 adds a black frame at the top, bottom, left and right part of the image in order to adjust the number of pixels and the aspect ratio. For example, the aspect ratio of the transmitted image is fixed to 16:9 or 4:3 according to the HDMI standard mentioned above, whereas the aspect ratio of the touch panel 14 of the smartphone 10 is different according to the model of the smartphone 10. Therefore, when outputting the image according to HDMI, the smartphone 10 may add the black frame different according to the model by the image output unit 12 thereby to adjust the aspect ratio.

Figure 3:
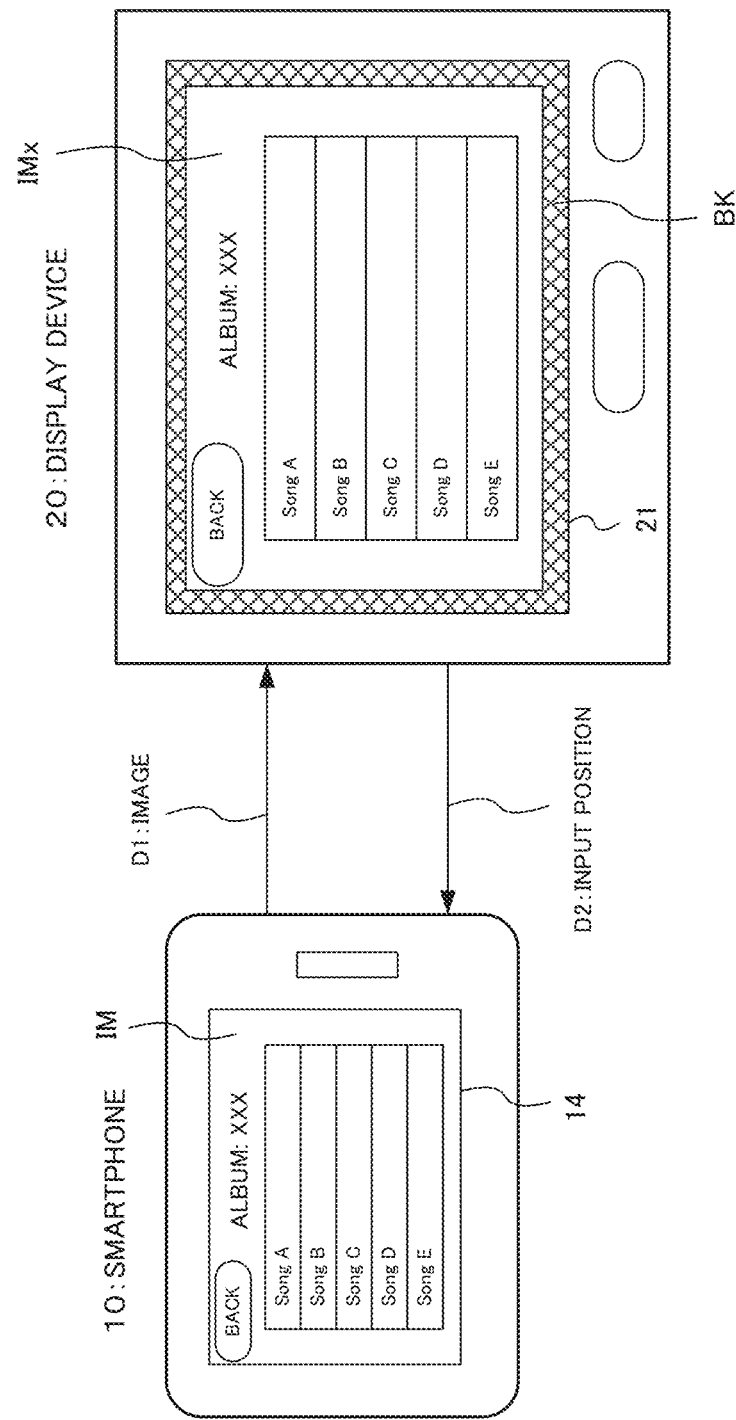
FIG. 3 illustrates an example of an image to which a black frame is added to adjust an aspect ratio.

FIG. 3 illustrates an example of the image to which the black frame is added in order to adjust the aspect ratio. The image IM is displayed on the touch panel 14 of the smartphone 10. The image IM includes a list of plural songs belonging to a certain album and the "BACK" button to return to the previous screen. When this image IM is transmitted to and displayed on the display device 20A, the smartphone 10 creates the image IMx by adjusting the aspect ratio to be in conformity with the HDMI standard, and transmits the image IMx to the display device 20A as the image D1. Thus, the image IMx displayed on the touch panel 21 of the display device 20A is the image created by adding the black frame area BK to the outer circumference of the image IM displayed on the smartphone 10.

In this case, since the black frame area BK is also displayed on the touch panel 21, the user can make the touch input to the black frame area BK. However, since the black frame area Bk does not exist in the image IM of the smartphone 10 and is not the operational input area, the touch input to the black area Bk should be treated as an inappropriate input. In addition, since the image IM displayed on the smartphone 10 and the image IMx displayed on the display device 20A have different scales, it is necessary to convert the position coordinates of the touch input to the area inside the black frame area BK to the position coordinates on the image IM of the smartphone 10.

Here, when the display device 20 has the image size adjusting function, the input position D2 transmitted from the display device 20 is already adapted to the image size of the smartphone 10, and it is not necessary for the smartphone 10 to perform the conversion processing of the position coordinates. On the contrary, when the display device 20A does not have the image size adjusting function as in the example of FIG. 2, the input position D2 transmitted from the display device 20A is adapted to the image size of the display device 20A but is not adjusted to the image size of the smartphone 10. Therefore, in this embodiment, when the display device 20A does not have the image size adjusting function and the smartphone 10 receives the coordinate conversion necessity information of "Coordinate Conversion: Necessary" from the display device 20A, the application 11 of the smartphone 10 functions as the converter 11x to perform this conversion processing.

Specifically, the converter 11x receives the input position D2 on the touch panel 21 (i.e., the input position on the image IMx) from the display device 20A, and converts it to the input position on the touch panel 14 of the smartphone 10 (i.e., the input position on the image IM). At this time, the converter 11x mainly executes the following two processing.

First, when the touch input to the black frame area BK is a simple touch (i.e., a type of touch that contacts substantially one point and is then released without the movement of the touched position), the converter 11x simply neglects the touch input. In contrast, when the touch input to the black frame area Bk is the input involving the movement of the touched position, such as a so-called "drag", the converter 11x converts the input position of the touch input to the black frame area BK to the position nearest to the input position in the area inside the black frame area BK (hereinafter referred to as "regular area"). By either of the above methods, the converter 11x handles the touch input to the black frame area BK.

Second, the converter 11x converts the input position of the touch input to the regular area to the corresponding position on the touch panel 14 of the smartphone 10. By this, even if the number of pixels of the touch panel 14 of the smartphone 10 is different from the number of pixels of the touch panel 21 of the display device 20A, the input position to the touch panel 21 of the display device 20A can be correctly converted to the input position to the touch panel 14 of the smartphone 10.

FIG. 4 illustrates an example of the above-described conversion method. First, the horizontal direction will be described. It is assumed that the dot number of the touch panel 21 of the display device 20 in the horizontal direction is "W", and each of the left and right widths of the black frame area BK displayed on the touch panel 21 are "Wa" and "Wb". Also, it is assumed that the dot number of the touch panel 14 of the smartphone 10 in the horizontal direction is "Ws".

In this case, the input position "X" on the touch panel 21 of the display device 20A is converted to the input position "xs" on the touch panel 14 of the smartphone 10 by the following equation:

$xs=0$:when $X<Wa$, $xs=Ws\cdot(X-Wa)/\{W-(Wa+Wb)\}$:when $Wa<X<Wb$, $xs=Ws$:when $X>(W-Wb)$ The same may apply to the vertical direction. It is assumed that the dot number of the touch panel 21 of the display device 20 in the vertical direction is "H", each of the top and bottom widths of the black frame area BK displayed on the touch panel 21 are "Hb" and "Ha", and the dot number of the touch panel 14 of the smartphone 10 in the vertical direction is "Hs".

In this case, the input position "Y" on the touch panel 21 of the display device 20 is converted to the input position "ys" on the touch panel 14 of the smartphone 10 by the following equation:

$ys=0$:when $Y<Ha$, $ys=Hs\cdot(X-Ha)/\{H-(Ha+Hb)\}$:when $Ha<Y<Hb$, $ys=Hs$:when $Y>(H-Hb)$ It is noted that, when the touch input to the black frame area BK is the simple touch, the converter 11x may neglect the touch input as mentioned above.

According to the above-described conversion method, even when the image IMx including the black frame area BK is displayed on the touch panel 21 of the display device 20A, the input position to the touch panel 21 can be correctly converted to the input position to the touch panel 14 of the smartphone 10.

In order to perform the above-described conversion, the dot numbers (the dot number in the vertical direction: Hs, the dot number in the horizontal direction: Ws) of the touch panel 14 of the smartphone 10, the dot numbers (the dot number in the vertical direction: H, the dot number in the horizontal direction: W) of the touch panel 21 of the display device 20A, and the widths of the top, bottom, left and right part of the black frame area BK (Wa, Wb, Ha, Hb) are needed. The application 11 can obtain the dot numbers of the touch panel 14 of the smartphone 10 from the control unit 13 of the smartphone 10, and can obtain the dot numbers of the touch panel 21 of the display device 20 from the display device 20A. However, the widths of the top, bottom, left and right part of the black frame area BK are not normally owned by the smartphone 10 and the display device 20A.

Therefore, the application 11 obtains the widths of the top, bottom, left and right part of the black frame area BK from the server 1 as the calibration information D3. Specifically, the widths of the top, bottom, left and right part of the black frame area BK is determined based on the specification of the touch panel 14 of the smartphone 10 and the specification of the touch panel 21 of the display device 20A. Therefore, the server 1 retains the widths of the top, bottom, left and right part of the black frame area BK in correspondence with the combination of the smartphone 10 and the display device 20A as the calibration information D3 in advance. For example, the server 1 stores the calibration information D3 indicating the widths of the top, bottom, left and right part of the black frame area BK in correspondence with the combination of the ID indicating the model name of the smartphone 10 and the ID indicating the model name of the display device 20A. When the smartphone 10 is connected to the display device 20A, the smartphone 10 obtains the ID of the display device 20, transmits the ID of the smartphone 10 and the ID of the display device 20 to the server 1, and obtains the calibration information D3 corresponding to the combination of those IDs. Then, the smartphone 10 uses the obtained calibration information D3 to convert the input position to the touch panel 21 of the display device 20A to the input position to the touch panel 14 of the smartphone 10.

[In Case of Display Device with Image Size Adjusting Function]

Figure 5:
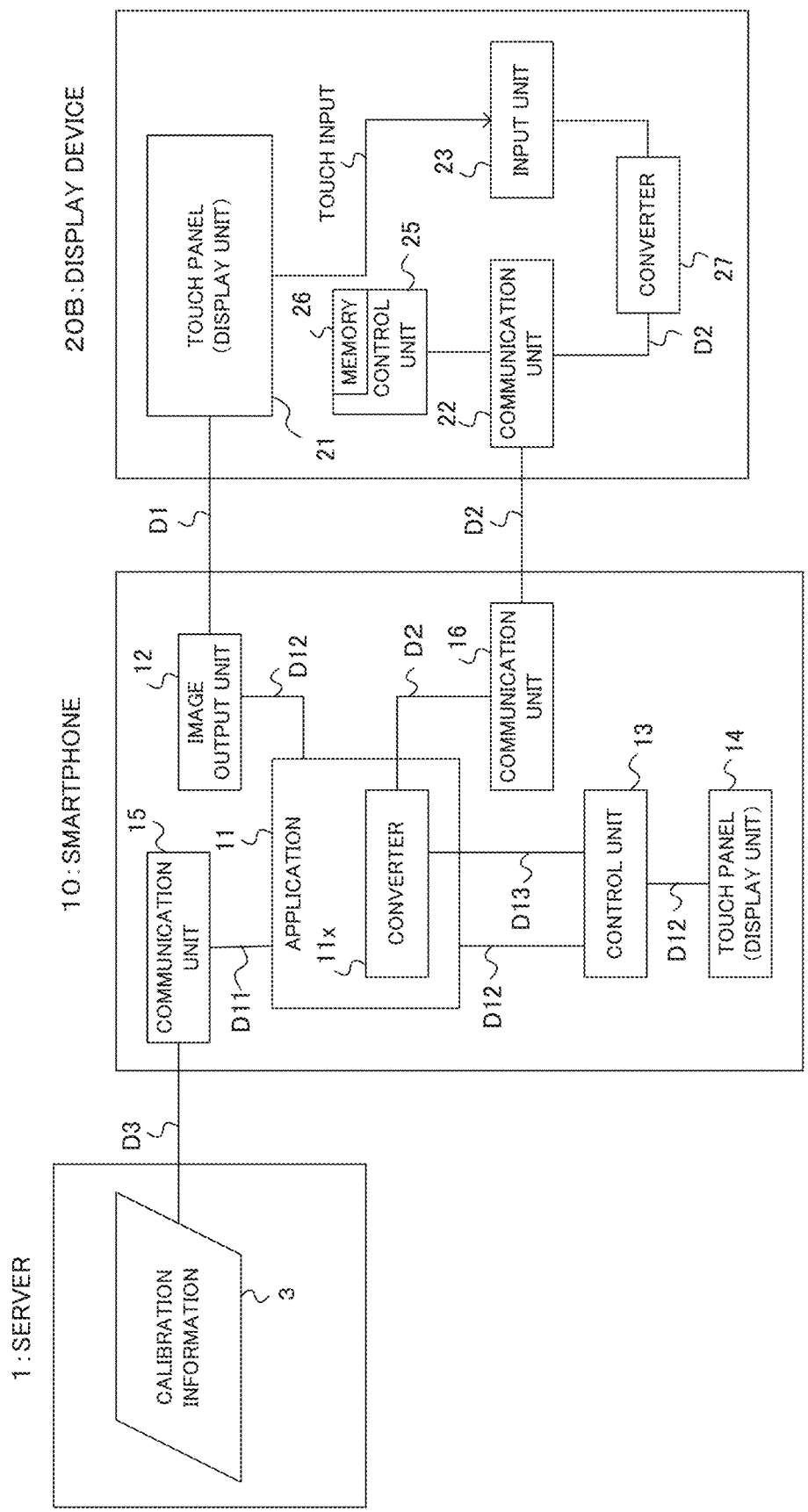
FIG. 5 is a block diagram illustrating a functional configuration of the system when a display device with an image size adjusting function is used.

FIG. 5 is a block diagram illustrating a functional configuration of the system shown in FIG. 1 when the display device 20B with the image size adjusting function is used. The image size adjusting function is such a function that a user arbitrarily cuts out a part of an image displayed on a display device, enlarges the image thus cut out to the whole size of the screen and displays it, for example. As is understood by the comparison with FIG. 2, the display device 20B in FIG. 5 is different from the display device 20A shown in FIG. 2 in that it includes a converter 27 to convert the input coordinates outputted by the input unit 23 and supply them to the communication unit 22 as the input coordinates D2. Other than this, the display device 20B is the same as the display device 20A shown in FIG. 2. Also, in FIG. 5, the server 1 and the smartphone 10 are the same as those in FIG. 2.

As described above, when the smartphone 10 transmits the image to the display device 20B, it may add the black frame to the top, bottom, left and right area of the image so as to adjust the number of pixels and the aspect ratio. In that case, since the black frame added by the smartphone 10 is a part of the image data, it is displayed on the display unit 21 of the display device 20B as it is. Therefore, the user uses the image size adjusting function of the display device 20B to enlarge the image D1 transmitted from the smartphone 10 such that the black frame is not displayed (by cutting out the image area other than the black frame). Thus, the black frame added by the smartphone 10 is not shown on the display unit 21 of the display device 20B.

In addition, the display device 20B recognizes how much the user has enlarged the display image by the image size adjusting function, and the converter 27 converts the user's input position on the display image after the enlargement to the coordinates of the input position on the display image before the enlargement (i.e., the input position corresponding to the image size of the smartphone 10). Thus, when the user has enlarged the display image to an arbitrary size, the input position (input coordinates) of the user's touch input can be correctly converted to the input position on the image size of the smartphone 10. The communication unit 22 transmits, to the smartphone 10, the input position D2 after being converted to fit the image size of the smartphone 10 by the converter 27. In this way, the coordinate conversion on the smartphone 10 side becomes unnecessary.

Since the display device 20B shown in FIG. 5 has the image size adjusting function, the memory 26 of the control unit 25 stores "Adjusting Function Flag=1". Therefore, the control unit 25 notifies the smartphone 10 of the coordinate conversion necessity information indicating that the coordinate conversion on the smartphone 10 side is unnecessary ("Coordinate Conversion: Unnecessary"). Thus, the smartphone 10 does not perform the coordinate conversion, and it becomes possible to prevent the smartphone 10 from performing unnecessary coordinate conversion even though the display device 20B transmits the input position D2 correctly adapted to the image size of the smartphone 10.

Further, the display device 20B may obtain the calibration information D3 from the smartphone 10 via the communication unit 22, and the converter 27 may perform the conversion processing described above by using the obtained calibration information D3, for example. With this configuration, even if the user cuts out and enlarges the image area partly including the black frame by the image size adjusting function, the appropriate coordinate conversion between the display device 20B and the smartphone 10 can be performed.

[Input Position Conversion Processing]

Figure 6:
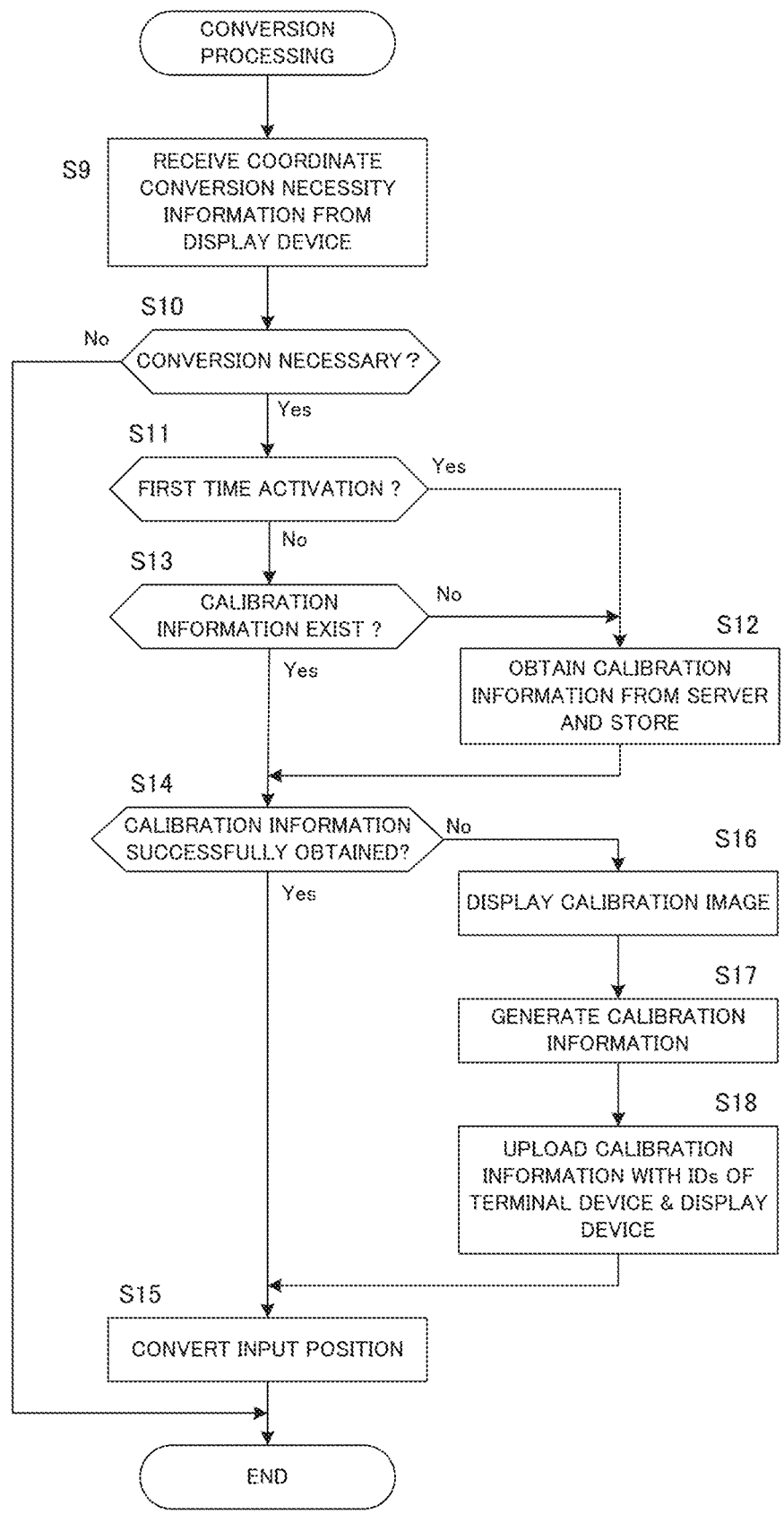
FIG. 6 is a flowchart of input position conversion processing.

FIG. 6 is a flowchart of input position conversion processing. This processing is executed by the application 11 in the smartphone 10. It is assumed that the smartphone 10 and the display device 20 can communicate with each other. This processing is executed when the application 11 is activated on the smartphone 10.

First, when the application 11 is activated, the application 11 requests the display device 20 to transmit the coordinate conversion necessity information, and receives the coordinate conversion necessity information from the control unit 25 of the display device 20 (step S9). As described above, the coordinate conversion necessity information is determined based on whether or not the display device 20 has the image size adjusting function. When the coordinate conversion necessity information received from the display device 20 is "Coordinate Conversion: Unnecessary" (step S10: No), the coordinate conversion on the smartphone 10 side is unnecessary, and the application 11 ends the processing.

On the other hand, when the coordinate conversion necessity information received from the display device 20 is "Coordinate Conversion: Necessary" (step S10: Yes), the application 11 determines whether it is the first time activation or not (step S11). This determination is made based on processing history information stored in the application 11, for example.

When it is the first time activation (step S11; Yes), normally the application 11 does not have the calibration information yet. Therefore, the application 11 specifies the ID of the smartphone 10 and the ID of the display device 20 to request the calibration information corresponding to the combination of those IDs, and obtains the corresponding calibration information to store it in the storage unit of the smartphone 10 (step S12). Then, the processing goes to step S14.

On the other hand, when it is not the first time activation (step S11; No), the application 11 determines whether or not the calibration information exists in the storage unit of the smartphone 10 (step S13). The calibration information in this case means the calibration information corresponding to the combination of the smartphone 10 and the display device 20 currently used. When the calibration information does not exist (step S13; No), the application 11 obtains the calibration information from the server 1 (step S12). On the other hand, when the calibration information exists (step S13; Yes), the processing goes to step S14.

In step S14, the application 11 determines whether or not the calibration information is successfully obtained. Namely, the application 11 determines whether or not the calibration information is prepared by the processing of step S12 or S13. When the application 11 successfully obtains the calibration information (step S14; Yes), the processing goes to step S15.

On the other hand, when the application does not successfully obtain the calibration information (step S14; No), the application 11 executes the processing of generating the calibration information by itself by utilizing the display device 20. Specifically, the application 11 transmits the calibration image to the display device 20 to display the calibration image on the touch panel 21 of the display device 20 (step S16). As the reason why the calibration information is not successfully obtained, there may be a case where the server 1 does not have the calibration information corresponding to the combination of the smartphone 10 and the display device 20, or a case where the communication with the server 1 cannot be normally executed.

Figure 7:
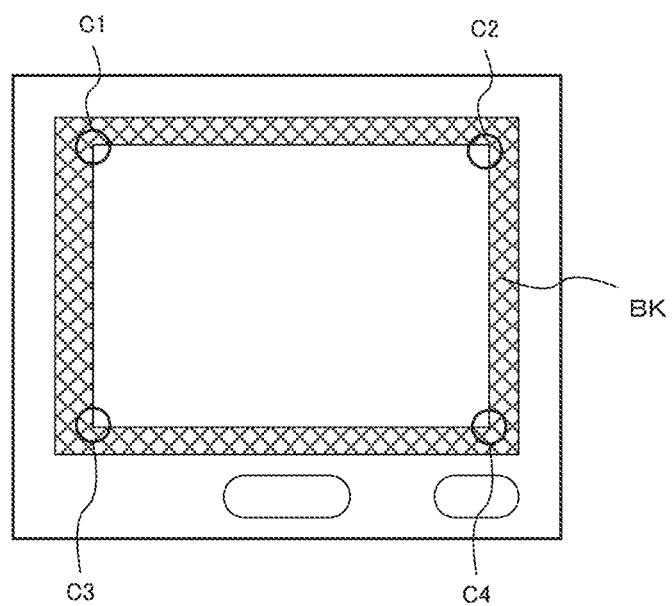
FIG. 7 illustrates an example of a calibration image.

FIG. 7 shows an example of the calibration image. In the example of FIG. 7, the application 11 transmits the image, expressing the regular area by the light and shade in order to distinguish it from the black frame area BK, to the display device 20 as the calibration image. In this case, the calibration image includes the black frame area BK based on the difference of the number of pixels and/or the aspect ratio between the touch panel 14 of the smartphone 10 and the touch panel 21 of the display device 20. Further, the application 11 indicates the inner four corners of the black frame area BK by the marks C1 to C4 to make the user touch those inner four corners of the black frame area BK. When the user touches the positions of the marks C1 to C4, the display device 20 acquires the coordinates of each position, and transmits them to the smartphone 10.

The application 11 receives the position coordinates corresponding to the inner four corners of the black frame area BK, generates the calibration information by calculating the widths of the top, bottom, left and right part of the black frame area BK, and then stores it in the storage unit of the smartphone 10 (step S17). Further, the application 11 uploads the calibration information thus generated to the server 1 together with the ID of the smartphone 10 and the ID of the display device 20 (step S18). By this, the calibration information corresponding to the combination of the smartphone and the display device is prepared in the server 1, and it can be used by other users after that time. Then, the processing goes to step S15.

In step S15, the application 11 converts the input position by using the prepared calibration information (step S15). Namely, the application 11 obtains the input position to the touch panel 21 of the display device 20 from the display device 20, and converts it to the input position to the touch panel 14 of the smartphone 10. Then, the application 11 supplies the input position D13 obtained by the conversion to the control unit 13 of the smartphone 10, and ends the conversion processing. It is noted that the control unit 13 of the smartphone 10 processes the operational input by the user based on the input position D13.

In this way, even when the specification such as the number of pixels and/or the aspect ratio is different between the touch panel 14 of the smartphone 10 and the touch panel 21 of the display device 20 and therefore the black frame area BK is displayed in the display image of the display device 20, the input position to the touch panel 21 of the display device 20 can be correctly converted to the input position to the touch panel 14 of the smartphone 10.

When the calibration information used to convert the input position is stored in the smartphone 10, the application 11 uses it, and therefore the application 11 does not have to download the calibration information from the server 1. In a case where the application 11 cannot obtain the calibration information from the server 1, the application 11 generates the calibration information based on the input by the user by using the calibration image as shown in FIG. 7. Therefore, even in case of using a smartphone or a display device of new model whose calibration information does not exist yet in the server 1, the conversion of the input position is possible. Generating the calibration information by using the calibration image as described above is performed not only in a case where the application 11 cannot obtain the calibration information. For example, the processing of generating the calibration information may be registered in a menu of the smartphone 10 and may be performed when the user desires.

Since the application 11 uploads the calibration information thus generated to the server 1, other users can use the calibration information after that. If the server 1 receives the calibration information from plural smartphones, it may retain the calibration information of high accuracy by analyzing the accuracy of them and/or averaging them.

Modified Example

In the embodiment described above, the control unit 25 transmits the coordinate conversion necessity information of "Coordinate Conversion: Unnecessary" to the smartphone 10 when the display device 20 has the image size adjusting function, and transmits the coordinate conversion necessity information of "Coordinate Conversion: Necessary" to the smartphone 10 when the display device 20 does not have the image size adjusting function.

However, even if the display device 20 has the image size adjusting function, when the user is displaying the image D1 transmitted from the smartphone 10 on the display unit 21 as it is, without actually using the image size adjusting function (e.g., the image size adjusting function is being set to "OFF" state), the control unit 25 may transmit the coordinate conversion necessity information of "Coordinate Conversion: Necessary" to the smartphone 10 to perform the coordinate conversion on the smartphone 10 side.

Also, when the image size adjusting function on the display device 20 side includes not only the enlargement of the entire image but the enlargement only in vertical or horizontal direction, the control unit 25 may notify the smartphone 10 of the necessity of the coordinate conversion of the vertical or horizontal direction as the coordinate conversion necessity information. For example, when the user is performing the size adjustment only in the vertical direction and is not performing the size adjustment in the horizontal direction by the image size adjusting function of the display device 20, the control unit 25 may transmit the coordinate conversion necessity information of "Vertical Direction Coordinate Conversion: Unnecessary, Horizontal Direction Coordinate Conversion: Necessary" to the smartphone 10.

INDUSTRIAL APPLICABILITY

This invention can be used in a case where a terminal device such as a smartphone is connected to a display device, not only an on-vehicle display device, having an operation unit of a touch input.

DESCRIPTION OF REFERENCE NUMBERS

1 Server
10 Smartphone
11 Application
11x, 24 Converter
12 Image Output Unit
13 Control Unit
14, 21 Touch Panel
20 Display Device

The invention claimed is:

1. A system comprising a terminal device and a display device communicable with each other,
wherein the terminal device comprises:
a display unit configured to display a first image;
an image output unit configured to output a second image including the first image to the display device; and
an obtaining unit configured to obtain, from the display device, information related to specification of a touch panel of the display device,
the image output unit determining specification of the second image based on the information related to the specification of the touch panel,
wherein the display device comprises:
an adjustment unit configured to adjust an image size of the second image;
the touch panel configured to display the second image adjusted by the adjustment unit;
an input unit configured to detect an input position of an operational input to the touch panel by a user;
a conversion unit configured to convert the input position to a converted input position which is an input position on the second image before adjustment; and
a communication unit configured to transmit the converted input position to the terminal device, wherein the terminal device further comprises a control unit configured to execute processing corresponding to the operational input in accordance with the converted input position.

2. The system according to claim 1, wherein the image output unit determines a number of pixels or an aspect ratio of the second image based on the information related to the specification of the touch panel obtained from the display device.

3. The system according to claim 1, wherein the image output unit generates the second image by adding a black frame to the first image.

4. The system according to claim 1, wherein the image output unit generates the second image by adding a black frame to the first image based on the information related to the specification of the touch panel obtained from the display device.

5. The system according to claim 1, wherein the adjustment unit adjusts the image size by enlarging a part of the second image.

6. The system according to claim 1, wherein the adjustment unit adjusts the image size by enlarging a part of the second image such that a black frame of the second image is not displayed.

7. The system according to claim 1, wherein the adjustment unit switches ON and OFF a function of adjusting the image size.

8. The system according to claim 1, wherein the adjustment unit adjusts the image size by enlarging a part of the second image, and
wherein the adjustment unit switches ON and OFF a function of adjusting the image size.

9. The system according to claim 1,
wherein the second image is transmitted from the terminal device to the display device via an HDMI, and
wherein the converted input position is transmitted from the display device to the terminal device via Bluetooth.

10. The system according to claim 1,
wherein the image output unit generates the second image by adding a black frame to the first image based on the information related to the specification of the touch panel obtained from the display device,
wherein the adjustment unit adjusts the image size by enlarging a part of the second image, and
wherein the adjustment unit switches ON and OFF a function of adjusting the image size.

11. The system according to claim 10,
wherein the second image is transmitted from the terminal device to the display device via an HDMI, and
wherein the converted input position is transmitted from the display device to the terminal device via Bluetooth.

12. A display device communicable with a terminal device comprising a display unit configured to display a first image, comprising:
a receiving unit configured to receive a second image including the first image from the terminal device;
an adjustment unit configured to adjust an image size of the second image;
a touch panel configured to display the second image adjusted by the adjustment unit;
an input unit configured to detect input position of an operational input to the touch panel by a user;
a conversion unit configured to convert the input position to a converted input position which is an input position on the second image before adjustment; and
a communication unit configured to transmit the converted input position to the terminal device.

13. The display device according to claim 12, wherein the adjustment unit adjusts the image size by enlarging a part of the second image.

14. The display device according to claim 12, wherein the adjustment unit switches ON and OFF a function of adjusting the image size.

15. The display device according to claim 12, wherein the adjustment unit adjusts the image size by enlarging a part of the second image, and
wherein the adjustment unit switches ON and OFF a function of adjusting the image size.

* * * * *